Patented Dec. 1, 1942

2,303,582

UNITED STATES PATENT OFFICE 2,303,582

TREATMENT OF ORGANIC SULPHATES

Kenneth Lyman Russell, Gilbert De Wayne Miles, and Adam Carr Bell, New York, N. Y., assignors to Colgate-Palmolive-Peet Company, Jersey City, N. J., a corporation of Delaware No Drawing. Application October 8, 1938, Serial No. 233,980

6 Claims. (Cl. 260—400)

This invention relates to an improved method of purifying certain organic sulphates.

The compounds contemplated by this invention may be generally defined as neutralized sulphuric acid esters of polyhydroxy compounds, the polyhydroxy compounds having substituted therein in place of at least one of the hydrogen atoms of the hydroxyl groups alkyl or acyl radicals containing at least six carbon atoms. This class of compounds is defined and described in U. S. Reissue Patent No. 20,636, which issued in the name of Benjamin R. Harris as inventor. More particularly the process is directed to purifying such substances in which the polyhydroxy compounds are the residues of glycols and glycerol, and the acyl radicals correspond to the fatty acids obtainable from cocoanut oil.

Many methods have been devised and described for purifying "sulphonates" of all types, but their success has been limited or their operation complicated. The primary object of "purifying" these organic detergents being the removal of inorganic salts formed in neutralizing the acidic mixture resulting from the treatment of organic compounds containing an excess of strong sulphuric acid, or other "sulphonating" agent, considerable attention has been directed to methods of neutralizing with a base which would form an inorganic salt insoluble in water. This requires filtering to remove the inorganic salt. Such a process involves additional equipment, labor, supervision, etc., as well as the steps of diluting the mixture to a degree which will facilitate filtration and subsequent concentration.

In another method which has been employed for purifying organic sulphates by removing therefrom inorganic salt, the inorganic salt has been precipitated from a solution of the mixture in water by the addition of certain organic liquids, a common one for this use being methyl alcohol; or the organic sulphate is extracted from the dry mixture by the organic liquid. In either case, the insoluble inorganic salt is removed by filtration, or equivalent procedure, followed by washing the insoluble inorganic precipitate with the organic liquid in order to effect a complete recovery of the organic sulphate. This method of purification requires relatively large amounts of the organic liquid and produces the organic sulphate in a dilute solution of water and/or organic liquid thereby necessitating recovery from a large quantity of solvent. Moreover, such a method involves additional time, space, equipment, etc., and is exceedingly troublesome.

Applicants have discovered that under certain conditions the separation of salts, produced as a by-product in the neutralization of organic sulphates, hereinbefore defined and hereinafter referred to as an organic sulphate, where an excess of sulphuric acid is present, may be easily and simply effected even though the salt or salts (usually sodium sulphate) is soluble in the aqueous solution of the organic sulphate. While this process is directed to the purification of organic sulphates of the class defined, it is especially efficient and desirable when the organic sulphate contains the residue of glycerol.

According to this invention the mixture of organic sulphate and inorganic salt is dissolved in water, and an aliphatic alcohol, containing at least two carbon atoms in the molecule, is added to the solution. After mixing, the liquid rapidly separates into two distinct layers, one of which contains an aqueous-alcoholic solution of the organic sulphate substantially free from inorganic salt, and the other layer contains substantially all the inorganic salt, practically no organic sulphate and a very small proportion of the alcohol. Concentrations, temperature, etc., have an important influence on the successful operation of this process as will be pointed out later. The layers thus formed may then be separated and the alcohol and water separated from the organic sulphate by known methods, such as by evaporation, and used again in the same process or for other purposes as desired. In some instances where the organic sulphate is to be utilized in solution, the water-alcohol layer containing the organic sulphate may be employed since the alcohol, as in the case of ethanol, will be desirable in many products.

Table I refers to aqueous solutions of a mixture of the sodium salt of the sulphate of monoglyceride of cocoanut oil fatty acids and sodium sulphate, the percentages being 35% of the former and 65% of the latter. These were prepared so that the percentage solids were as indicated in the first column. With these solutions one alcohol or another was mixed until a separation resulted. The values under the various alcohol headings show the percentages of alcohol, on the basis of solids by weight, which will cause a separation with the particular alcohol indicated.

*Table I*

| Concentration of organic sulphate and sodium sulphate | Na₂SO₄ | Ethanol (95%) | Isoprop- (98%) | N-butan-ol | N-hexan-ol |
|---|---|---|---|---|---|
| 40% | 26% | 17 | 8.5 | 13 | 9 |
| 35 | 22.75 | 23 | 15 | 15 | 11 |
| 30 | 19.5 | 48 | 20 | 18 | 13 |
| 25 | 16.25 | 90 | 25 | 20 | 16 |
| 20 | 13 | 142 | 76 | 26 | 19 |
| 15 | 9.75 | 260 | 164 | 36 | 22 |
| 10 | | | | | 31 |

The determinations throughout were at a temperature of about 100° F.

In further explanation of Table I, it may be seen that 17% of a 40% solution of solids is 6.8%, or to every 100 grams of an aqueous solution containing 40 grams of solids (14 grams of organic sulphate and 26 grams of sodium sulphate), 17% of 40 grams or 6.8 grams of ethanol must be added to cause a separation into layers. Larger amounts of alcohol may also be used, and in practising the invention it is preferable to use somewhat more alcohol than the minimum that will just effect a separation into layers.

The table also shows that a separation cannot be efficiently produced at the temperature indicated by adding ethyl alcohol to a 15% solution of the mixture, and the quantity of isopropyl alcohol necessary to produce a separation in a 15% solution is too great to make the separation of a solution of that concentration very desirable, while a solution of that concentration may be advantageously purified according to this invention if either n-butanol or n-hexanol are used as the solvent. In any case, the concentration of the sodium sulphate has an important bearing upon the separation. The concentration of the salt in aqueous solution should be at least about 13% in order that ethanol may advantageously cause the formation of layers, and for each alcohol employed, or mixtures thereof, there is a minimum concentration of sodium sulphate that may be advantageously employed.

The maximum concentration is governed primarily by the maximum amount of solids which will dissolve in a given quantity of water. Applicants have found that it is difficult to prepare and handle a concentration of substantially greater than 40% solids (35:65). However, the amount of alcohol required to effect a separation appears roughly to vary inversely with the concentration of the solids.

Temperature at which the process is practised is important inasmuch as certain limits thereof are critical. For instance, the maximum solubility of sodium sulphate in water is attained at about 32.5° C., hence, if the solid mixture is dissolved in just enough water to effect complete solution at that temperature and the temperature is allowed to change during the process to a material extent, some of the sodium sulphate will precipitate. With a more dilute solution, a wider temperature range is satisfactory, but in the case of a 35% concentration (the solids being approximately 35% organic sulphate and 65% sodium sulphate), the temperature should be kept between about 25° C. and about 70° C.

The description above, with respect to concentrations, has been devoted primarily to the quantity of solvent which will just cause the formation of two distinct phases or layers; however, better results will be obtained by employing proportions of alcohols greater than those which will just cause the separation. Table II shows the efficiency of the process when various percentages of isopropyl alcohol (98%) are used with a 40% solution of the mixture of sodium sulphate and the organic sulphate as employed to ascertain the data given in Table I (65:35). Three hundred grams of 40% solution of the mixture of solids were used in each case, hence 78 grams of sodium sulphate and 42 grams of the organic sulphate were present in each portion.

*Table II*
(100° F.)

| Isopropyl alcohol (98%) (per cent by weight based on whole solution, and grams) | | Sodium sulphate removed | Removal of sodium sulphate |
|---|---|---|---|
| Percent | Grams | | |
| | | Grams | Per cent |
| 12.0 | 36.0 | 72 | 92.5 |
| 9.6 | 28.8 | 72 | 92.5 |
| 8.0 | 24.0 | 72.5 | 93.0 |
| 6.4 | 19.2 | 68.8 | 88.0 |
| 4.8 | 14.4 | 62.5 | 80.0 |

The efficiency of ethyl alcohol (95%) in the process is indicated by the values given in Table III in which 35% solutions of a mixture of sodium sulphate and the organic sulphate were used (65:35), all the separations being obtained at 100–105° F.

*Table III*

| Ethanol (per cent by weight of solution taken) | | Na₂SO₄ removed | Na₂SO₄ removed |
|---|---|---|---|
| Per cent | Grams | | |
| | | Grams | Per cent |
| 14.0 | 42.0 | 72.6 | 93 |
| 12.5 | 37.5 | 70.5 | 90.5 |
| 10.4 | 31.2 | 64.0 | 82.0 |
| 8.4 | 25.2 | 59.2 | 76 |

The following examples are given to illustrate the process of the invention and are in no sense limitative.

*Example I*

A solution of 120 grams of a mixture of the sodium salt of the sulphuric acid esters of cocoanut oil fatty acids monoglycerides (42 grams) and sodium sulphate (78 grams) in 225 grams of water was prepared at 104° F. To this solution 36 grams of 95% ethyl alcohol were added and mixed. The liquid mass, when allowed to stand, rapidly separated into two layers, the upper layer containing the organic sulphate in an aqueous-alcohol solution which contained substantially all the alcohol and a relatively small quantity of sodium sulphate. The lower layer, containing substantially all of the sodium sulphate, was drawn off.

*Example II*

A solution was prepared by dissolving 40 grams of organic sulphate used in Example I and 75 grams of sodium sulphate in 200 grams of water, and 35 grams of isopropyl alcohol (98%) were thoroughly mixed therewith at about 100° F. On standing, two layers immediately formed, the top layer comprising the water-alcohol solution of the organic sulphate, and the sodium sulphate being in aqueous solution in the lower layer. After the separation, the alcohol and water were evaporated leaving the organic sulphate substantially free from inorganic salt.

Example III

To a solution of 18 grams of the ammonium salt of the sulphuric acid ester of the monoglycerides of cocoanut oil fatty acids and 32 grams of ammonium sulphate in 50 grams of water were added 12 grams of 95% ethyl alcohol. The mixture was stirred for a few minutes at about 100° F., then allowed to separate into two layers. In the lower salt layer a small amount of ammonium sulphate remained suspended in the form of fine solid particles, but this did not interfere with the removal of the layer. Examination of the layers after their separation showed that about 94% of the original amount of ammonium sulphate was in the lower layer and practically none of the organic sulphate.

Example IV

Into a solution composed of 45 grams of the organic sulphate employed in Example I, 45 grams of sodium sulphate and 135 grams of water, were stirred 32 grams of 98% isopropanol at 105° F. The mixture was then allowed to stand for three minutes. Separation into two layers took place readily. On removal of the clear aqueous salt layer, it was found to contain about 80% of the original amount of the sodium sulphate.

Example V

To a solution consisting of 42 parts of the organic sulphate used in Example I, 78 parts of sodium sulphate, and 180 parts of water were added 25 parts of n-hexanol while stirring at about 103° F. On discontinuing the stirring the mixture separated quickly into two layers. Upon separation and examination of the layers, it was found that 87.5% of the original sodium sulphate was in the lower salt layer. Or, the ratio of the organic sulphate to sodium sulphate in the upper layer was about 80:20 instead of 35:65 which it was in the original solution.

Example VI

In another case the product prepared from

|  | Parts |
|---|---|
| Cocoanut oil | 43.2 |
| Glycerine | 6.3 |
| Ethylene glycol | 4.7 |
| 25% oleum | 110.0 | and neutralized with 25% caustic soda solution (according to the process described in U. S. Patent No. 2,130,361, F. W. Muncie, inventor) was purified by removing the sodium sulphate as follows:

To 100 parts of a 40% solution of the products, 12 parts of 98% isopropanol were added and mixed, at about 105° F. Two layers formed. The top layer was found to contain substantially all the organic sulphates (both sulphates of monoglycerides and sulphates of fatty acid esters of glycol), and the lower layer contained substantially all the sodium sulphate.

Example VII

A solution was prepared by dissolving 15.2 parts of the sodium salt of the sulphuric acid esters of the monoglycerides of fatty acids derived from cocoanut oil and tallow (in equal proportions by weight) and 24.8 parts of sodium sulphate in 60 parts of water at about 105° F. After adding 15 parts of 98% isopropanol, mixing and allowing to stand, the liquid mixture separated readily into two layers. The separation of the sodium sulphate from the organic sulphates was substantially as in the preceding examples.

While the examples given indicate the starting material as being a mixture of organic sulphate and inorganic salt in the dry state, this invention is not limited thereto. This process is especially adaptable to the separation of organic sulphates from inorganic salts when the two are obtained in aqueous solution by commercial processes. Furthermore, the process is in no sense limited to mixtures of organic sulphates and inorganic salts in the proportions given in the examples and tables.

Two or more alcohols may be used together instead of one, as hereinbefore described, in the process of this invention, in which case the concentration necessary to produce separation of the aqueous solution of organic sulphate and inorganic sulphate will vary depending primarily upon the quantity of each alcohol employed.

Furthermore, although applicants have stressed the discovery and process of producing layers in solutions containing organic sulphate and inorganic sulphate by adding thereto certain quantities of the particular alcohols, the invention contemplates a process which completely removes the solvent liquids from the organic sulphates, when desirable, after separating the inorganic salt without injury thereto, as by evaporating the liquids under atmospheric or reduced pressure, by partial evaporation and centrifuging, or by freezing and centrifuging at reduced temperature or by other methods.

The organic sulphate solutions resulting from the purification processes, as illustrated by the examples given herein, may be directly employed in the process set out in our application Serial No. 230,384, filed September 17, 1938, of which this application is a continuation-in-part.

We claim:

1. The process of separating water-soluble inorganic salts in aqueous solution without solid salt precipitation from solutions of water-soluble salts of polyhydric alcohol partial ester partial sulphates which comprises essentially mixing at a temperature between about 25° C. and 70° C. at least one aliphatic alcohol containing at least two carbon atoms but not more than six carbon atoms with an aqueous solution containing more than 15% but not more than 40% of a mixture of water-soluble inorganic salt and water-soluble polyhydric alcohol partial ester partial sulphate salt, at least 13% of the aqueous solution being water-soluble inorganic sulphate salt, the proportion of alcohol being less than 260% of the total inorganic and organic salts content of the solution but in excess of that sufficient to form two liquid layers one of which is an aqueous alcoholic solution of the polyhydric alcohol partial ester partial sulphate salt and the other being an aqueous solution of the inorganic sulphate salt containing only a minor quantity of alcohol, and separating the two liquid layers.

2. The process of separating water-soluble inorganic salts in aqueous solution without solid salt precipitation from water-soluble salts of polyhydric alcohol partial ester partial sulphates which comprises essentially mixing at a temperature between about 25° C. and 70° C. ethanol with an aqueous solution containing more than 15% but not more than 40% of a mixture of water-soluble inorganic salt and water-soluble polyhydric alcohol partial ester partial sulphate salt, at least 13% of the aqueous solution being water-soluble inorganic sulphate salt, the proportion of ethanol being less than 260% of the total inorganic and organic salts content of the solution and sufficient to form two liquid layers one of which is an aqueous ethanolic solution of the polyhydric alcohol partial ester partial sulphate salt, the other being an aqueous solution of the inorganic sulphate salt containing only a minor quantity of alcohol, and separating the two liquid layers.

3. The process of separating water-soluble inorganic salts in aqueous solution from water-soluble salts of polyhydric alcohol partial ester partial sulphates which comprises essentially mixing at a temperature between about 25° C. and 70° C. isopropanol with an aqueous solution containing more than 15% but not more than 40% of a mixture of water-soluble inorganic sulphate salt and water-soluble polyhydric alcohol partial ester partial sulphate salt, at least 13% of the aqueous solution being water-soluble inorganic sulphate salt, the proportion of isopropanol being less than 164% of the total inorganic and organic salts content of the solution and sufficient to form two liquid layers one of which is an aqueous isopropanolic solution of the polyhydric alcohol partial ester partial sulphate salt, the other being an aqueous solution of the inorganic sulphate salt containing only a minor quantity of alcohol, and separating the two liquid layers.

4. The process of separating water-soluble inorganic salts in aqueous solution without solid salt precipitation from solutions of water-soluble salts of fatty acid partial glyceride partial sulphates which comprises essentially mixing at a temperature between about 25° C. and 70° C. at least one aliphatic alcohol having at least two carbon atoms but not more than six carbon atoms with an aqueous solution containing more than 15% but not more than 40% of a mixture of water-soluble inorganic salt and water-soluble fatty acid partial glyceride partial sulphate salt, at least 13% of the aqueous solution being water-soluble inorganic sulphate salt, the proportion of alcohol being less than 260% of the total inorganic and organic salts content of the solution but in excess of that sufficient to form two liquid layers one of which is an aqueous alcoholic solution of the fatty acid partial glyceride partial sulphate salt and the other being an aqueous solution of the inorganic sulphate salt containing only a minor quantity of alcohol, and separating the two liquid layers.

5. The process of separating water-soluble inorganic salts in aqueous solution without solid salt precipitation from solutions of water-soluble salts of fatty acid partial glyceride partial sulphates which comprises essentially mixing ethanol at a temperature between about 25° C. and 70° C. with an aqueous solution containing more than 15% but not more than 40% of a mixture of water-soluble inorganic salt and water-soluble fatty acid partial glyceride partial sulphate salt, at least 13% of the aqueous solution being water-soluble inorganic sulphate salt, the proportion of alcohol being less than 260% of the total inorganic and organic salts content of the solution but in excess of that sufficient to form two liquid layers one of which is an aqueous alcoholic solution of the fatty acid partial glyceride partial sulphate salt and the other being an aqueous solution of the inorganic sulphate salt containing only a minor quantity of alcohol, and separating the two liquid layers.

6. The process of separating sodium sulphate in aqueous solution without solid salt precipitation from solutions of sodium salts of fatty acid partial glyceride partial sulphates which comprises essentially mixing at a temperature between about 25° C. and 70° C. at least one aliphatic alcohol having at least two carbon atoms but not more than six carbon atoms with an aqueous solution containing more than 15% but not more than 40% of a mixture of sodium sulphate and sodium salt of a fatty acid partial glyceride partial sulphate at least 13% of the aqueous solution being sodium sulphate, the proportion of alcohol being less than 260% of the total inorganic and organic sodium salts content of the solution but in excess of that sufficient to form two liquid layers one of which is an aqueous alcoholic solution of the fatty acid partial glyceride partial sulphate sodium salt and the other being an aqueous solution of the sodium sulphate containing only a minor quantity of alcohol, and separating the two liquid layers.

KENNETH LYMAN RUSSELL.
GILBERT DE WAYNE MILES.
ADAM CARR BELL.